(12) United States Patent
Keim et al.

(10) Patent No.: US 8,308,484 B2
(45) Date of Patent: Nov. 13, 2012

(54) SYSTEM AND METHODS FOR DETECTING DECEPTION AS TO FLUENCY OR OTHER ABILITY IN A GIVEN LANGUAGE

(75) Inventors: Gregory Keim, Broadway, VA (US); Jack August Marmorstein, Harrisonburg, VA (US); Ronald Bryce Inouye, Harrisonburg, VA (US); Michael Scott Fulkerson, Harrisonburg, VA (US)

(73) Assignee: Rosetta Stone, Ltd., Arlington, VA (US)

( * ) Notice: Subject to any disclaimer, the term of this patent is extended or adjusted under 35 U.S.C. 154(b) by 1179 days.

(21) Appl. No.: 12/028,967

(22) Filed: Feb. 11, 2008

(65) Prior Publication Data
US 2009/0204406 A1    Aug. 13, 2009

(51) Int. Cl.
*G09B 19/06* (2006.01)
(52) U.S. Cl. ........................................ 434/157
(58) Field of Classification Search .................. 434/156, 434/178, 322–323, 350
See application file for complete search history.

(56) References Cited

U.S. PATENT DOCUMENTS

| | | | | |
|---|---|---|---|---|
| 4,505,682 A | * | 3/1985 | Thompson | 434/335 |
| 4,713,008 A | * | 12/1987 | Stocker et al. | 434/167 |
| 5,618,180 A | * | 4/1997 | Nathanson | 434/156 |
| 5,743,740 A | * | 4/1998 | Visser et al. | 434/128 |
| 5,876,334 A | * | 3/1999 | Levy | 600/300 |
| 2002/0106617 A1 | * | 8/2002 | Hersh | 434/236 |
| 2005/0187436 A1 | * | 8/2005 | Doniger et al. | 600/300 |

OTHER PUBLICATIONS

Jeffrey J. Walczyk "Cognitive Mechanisms Underlying Lying to Questions: Response Time as a Cue to Deception" Applied Cognitive Psychology Appl. Cognit. Psychol. 17: 755-774 (2003).*
Dryer Rebecca Are You Lying to Me? Using Nonverbal Cues to Detect Deception.*

* cited by examiner

*Primary Examiner* — Robert J Utama
(74) *Attorney, Agent, or Firm* — Kaplan Breyer Schwarz & Ottensen, LLP

(57) ABSTRACT

The invention relates to a system and methods for detecting when a user is representing he is not fluent in a language in which he is fluent. The present system and methods are adapted to be used in conjunction with conventional and novel computer systems and methods and provides detection of concealment of language skills by a user.

19 Claims, 6 Drawing Sheets

HORN

DRUMS

GUITAR

PIANO

US 8,308,484 B2

SYSTEM AND METHODS FOR DETECTING DECEPTION AS TO FLUENCY OR OTHER ABILITY IN A GIVEN LANGUAGE

FIELD OF THE INVENTION

The present invention is directed to a system for and methods of determining when a user misrepresents his skill in a language to be less than it actually is.

BACKGROUND OF THE INVENTION

For various reasons, a person may desire to keep his or her ability in a language a secret, or to misrepresent it. For example, a person may misrepresent that he was born and raised in the United States and speaks no Chinese, when he was really born and raised in China and speaks fluent Chinese. This problem is particularly important in the hiring of governmental employees with access to sensitive information.

There exist many techniques to test whether an individual who claims to speak fluent Chinese, for example, can really do so. However, there are no known techniques for accurately testing whether a person who claims to not speak fluent Chinese actually does speak fluent Chinese. For example, that person can simply pretend that he does not know the words too fluently, stutter, and claim he can not understand Chinese audio. Therefore, there is a need in the art for detecting false assertions about a lack of ability in a given language.

Further, the same issue exists with respect to writing, reading, comprehension, and other language skills beyond merely speaking. The following description is exemplary, but is intended to cover these other language skills as well.

SUMMARY OF THE INVENTION

In accordance with at least one aspect of the present invention, a system and methods are disclosed for determining when a user conceals ability in a language. In accordance with one or more embodiments relating to the detection of such concealment, a method includes writing a predetermined number of images with non-corresponding labels written in a language in which the user asserts he is not fluent.

Any image and non-corresponding label may be used in combination with the present invention. An image may be a word and/or an object. An image may be merged with the non-corresponding label. For example, an image or word of a color may be displayed in a non-corresponding color, which acts as a label. An image may be of a word or object when with a non-corresponding label, such as, but not limited to, a horse labeled "cat" or a guitar labeled "drum". The method detects users who do in fact know the tested language because the users state the images slowly when the users know the meanings of the non-corresponding labels. When users do not know the language being tested, the users respond more quickly because those users do not confuse the image with the non-corresponding label.

In accordance with another aspect of the present invention, a method is disclosed for determining when a user is concealing language ability, including writing a predetermined number of images with non-corresponding labels written in a language with which the user asserts he is unfamiliar, having the user state the images, and timing the user statements. In accordance with at least one embodiment, the method further comprises comparing the time of the user statements to an average and/or standard native speaker response time for each language tested for concealment. Average and/or standard native speaker statement response times may vary due to inherent linguistic differences between languages.

In accordance with yet another aspect of the present invention, a system is disclosed including at least a processor; at least a memory coupled to the processor; at least an input device coupled to the computer system; and one or more programs encoded by the memory, the one or more programs causing the processor to determine whether a user is falsely representing an at least one language as one with which he is not familiar, or in which he is not fluent, the one or more programs prompts the user to enter at least one language in which the user asserts he is not fluent; the one or more programs display a predetermined number of at least image with an at least one non-corresponding label in at least one language a user asserts is one in which he is not fluent; the user states the at least one image into the input device; and the one or more programs times the at least one user statement.

In accordance with a more general embodiment, an interference tester is constructed. Two channels of information are given to a user (e.g.; text and image, audio and text, two different audio, etc), and the information in one channel is selected to interfere with the information in the other channel. The user is then asked to convey the information in the other channel. If a user can not understand the information in the one channel, his answers will be quicker, and more of them will be accurate. By constructing response curves in advance from users that understand the information in the one channel, and those that do not, the tested user can be classified into one or the other, and concealment of his ability can be detected.

The advantages of this invention are best understood after reading the detailed description. Nonetheless, some of the advantages are aforementioned above.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, wherein like numerals indicate like elements, there are shown in the drawings simplified forms that may be employed, it being understood, however, that the invention is not limited by or to the precise arrangements and instrumentalities shown, but rather only by the issued claims. The drawings may not be to scale, and the aspects of the drawings may not be to scale relative to each other. To assist those of ordinary skill in the relevant art in making and using the subject matter hereof, reference is made to the appended drawings and figures, wherein:

DETAILED DESCRIPTION OF THE PRESENT INVENTION

Figure 1:
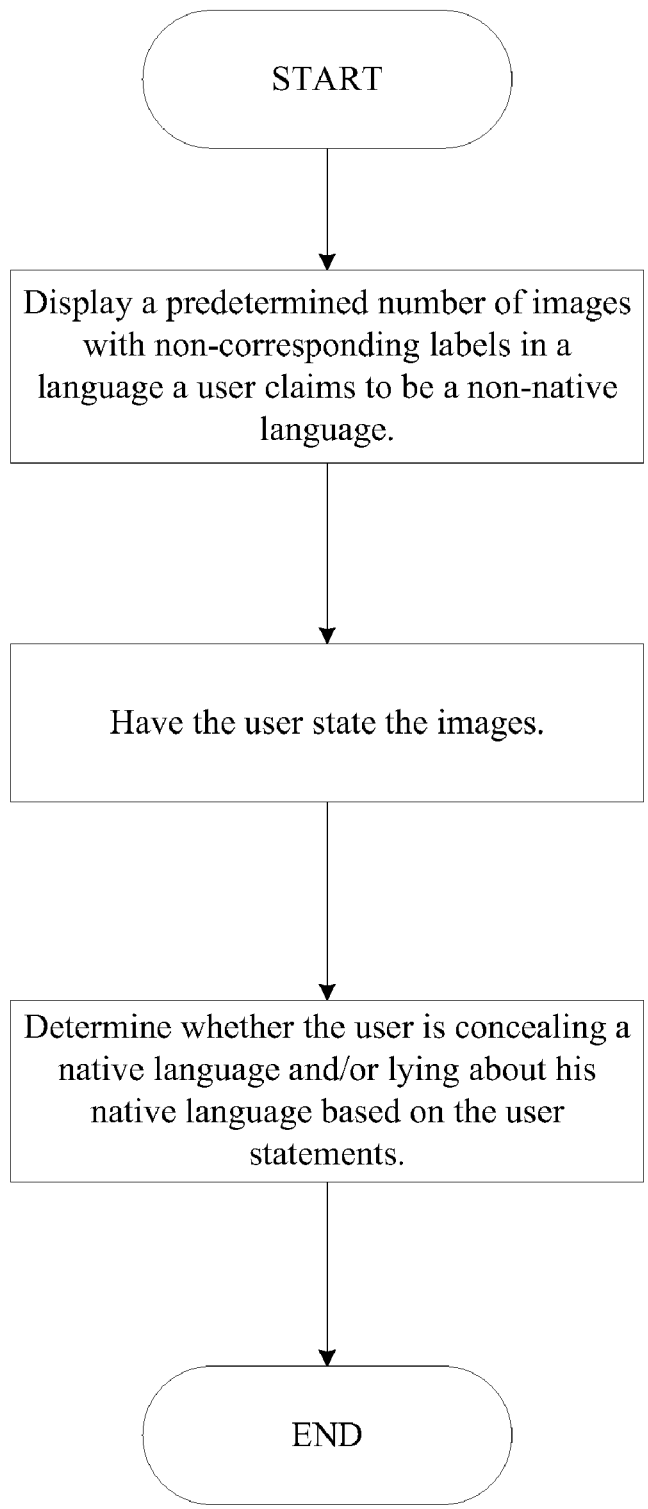
FIG. 1 is a flowchart view of an embodiment of a method for detecting concealment of language skill in accordance with at least one aspect of the present invention.

Now referring to FIG. 1, in general, methods for determining when a user is misrepresenting his skills in a language as less than what they actually are. In particular, the present invention relates to methods for detecting when a user is fluent in a language using response times of image statements in the alleged non-native language. A user that actually is fluent speaker responds with extra delay while a user that is not fluent responds quickly when reciting the images.

Again referring to FIG. 1, at least one embodiment of the present invention includes displaying a predetermined number of images with non-corresponding labels in a language the user claims to not be a native language, having the user state the images, and determining whether the user is concealing language skill based on the user statements.

Figure 2:
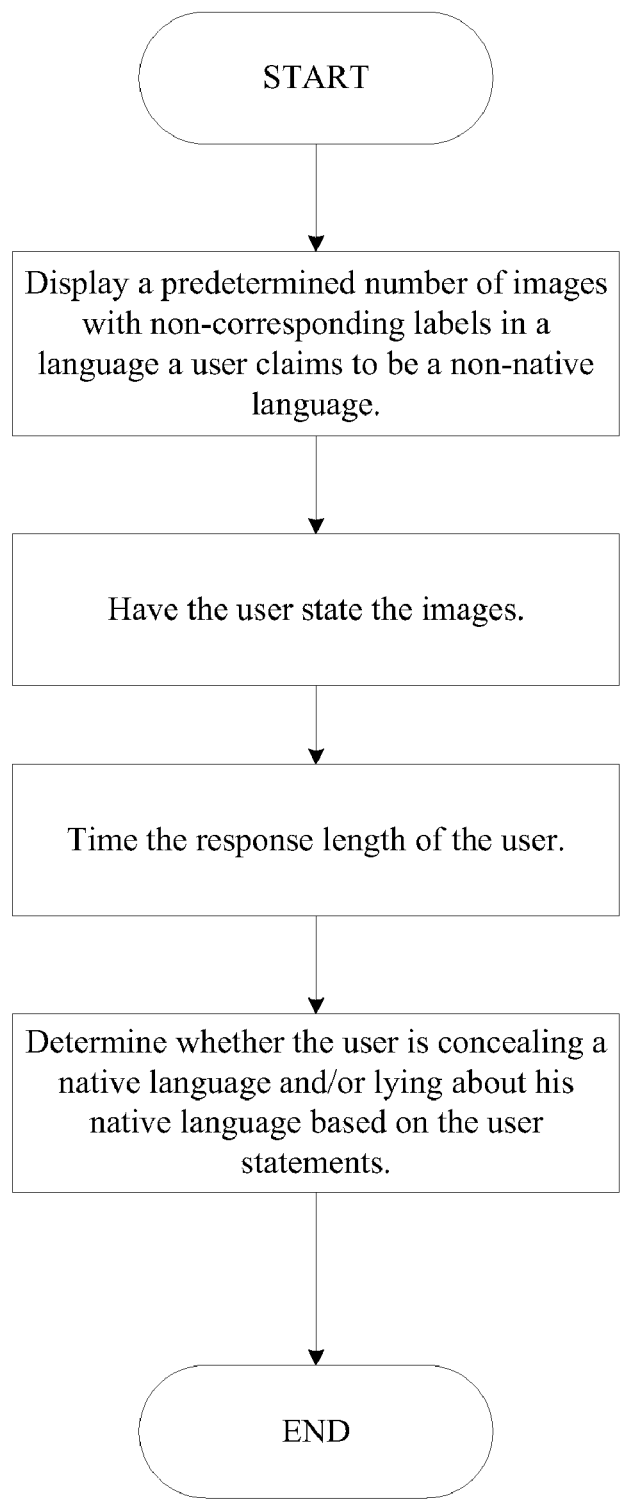
FIG. 2 is a flowchart view of an embodiment of a method for timing user responses and detecting concealment of language skill in accordance with at least one aspect of the present invention.

Now referring to FIG. 2, in an alternate embodiment, a method for detecting when a user is misrepresenting language skill includes writing a predetermined number of images with non-corresponding labels in a language in which the user claims to have little fluency, having the user state the images, timing the response length of the user, and determining whether the user is concealing a native language based on the user statements.

Figure 3:
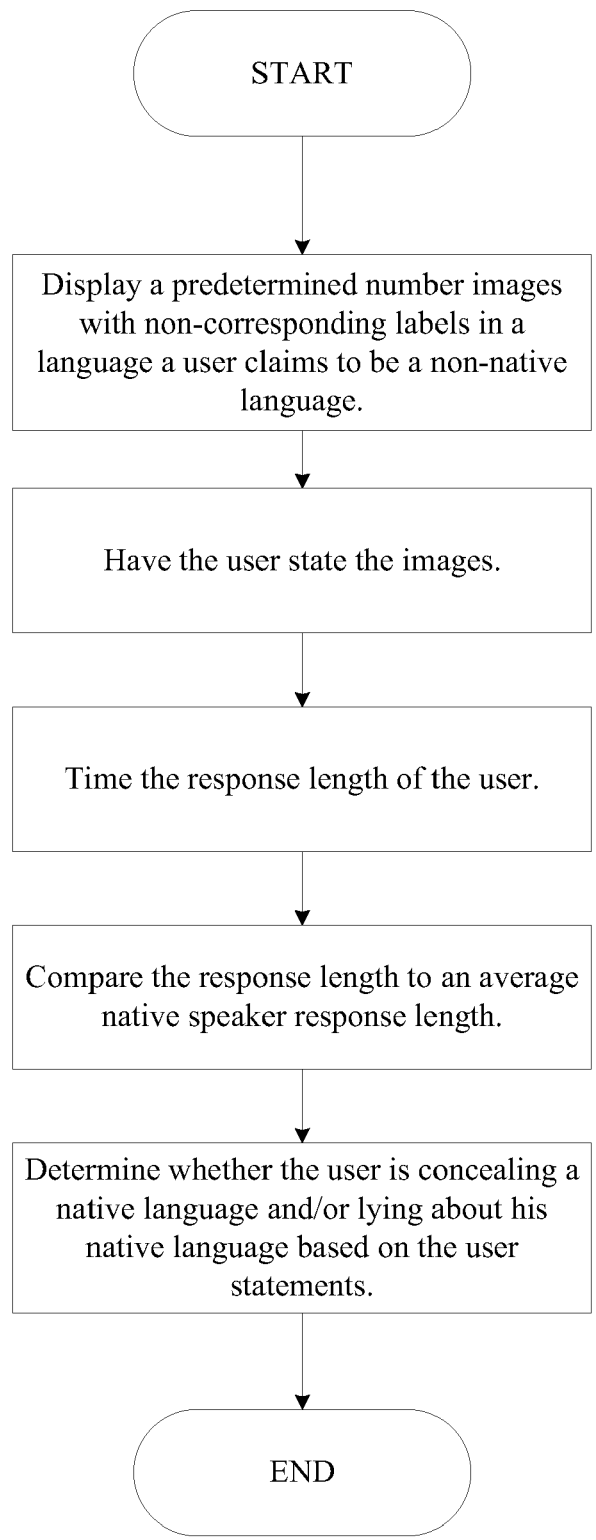
FIG. 3 is a flowchart view of an embodiment of a method for timing user responses, comparing times, and detecting concealment of language skill in accordance with at least one aspect of the present invention.

Now referring to FIG. 3, in yet another embodiment, a method for detecting the misrepresentation of language skills includes writing a predetermined number of images with non-corresponding labels in a language in which the user claims to not be fluent, having the user state the images, timing the response length of the user, comparing the response length to an average and/or standard native speaker response length, or to the response time of users having a specific fluency level in the subject language, and determining whether the user is concealing language skills based on the user responses.

In accordance with one or more embodiments, any image and non-corresponding label may be used in combination with the present invention. An image, such as, but not limited to, an object, a word, a picture, an illustration, a drawing, a document, a color, a file, or the like known to those skilled in the art, may be displayed with a non-corresponding label, such as, but not limited to an object, a word, a picture, an illustration, a drawing, a text, a color, a file, or the like. In one embodiment, an image is merged with the non-corresponding label. For example, a label or word of a color may be displayed in a non-corresponding image or illustration of color.

Figure 4:
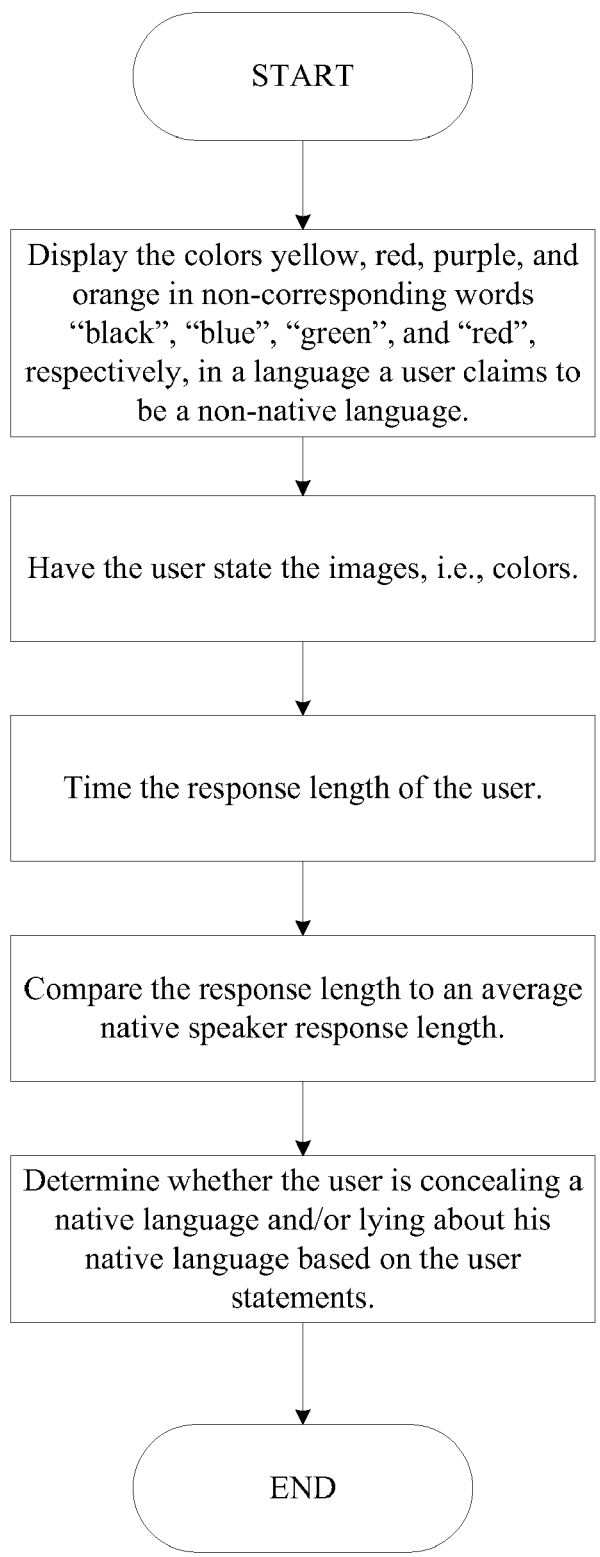
FIG. 4 is a flowchart view of an embodiment of a method for using specific predetermined non-associated words as labels and merged colors as images in accordance with at least one aspect of the present invention.

Now referring to FIG. 4, an exemplary embodiment method specifically includes the colors yellow, red, purple, and orange, written in merged non-corresponding words "black", "blue", "green", and "red", respectively. When a user does not know the meaning of the non-corresponding words, the user can state the colors quickly. However, when a user does know the language, the user states the colors slowly because the user confuses, for example based on the aforementioned, the non-corresponding label or word "blue" with the color red, the image.

Figure 5:
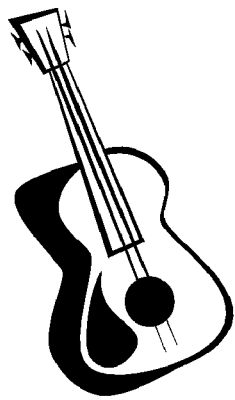
FIG. 5 is a flowchart view of an embodiment of a method for using specific predetermined pictures as images and using non-associated labels in accordance with at least one aspect of the present invention.
Figure 5:
Figure 5:
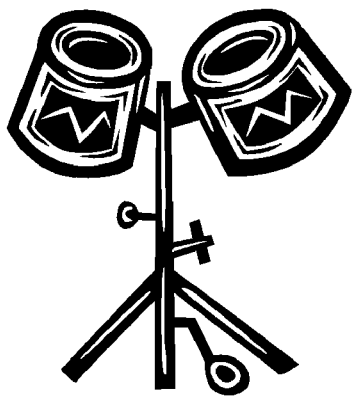
Figure 5:
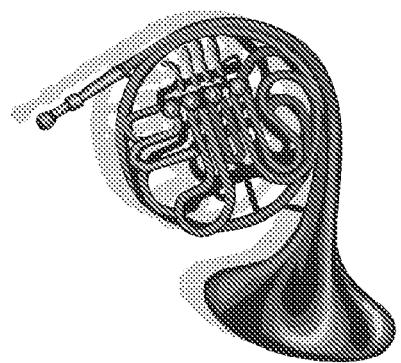

In accordance with one or more embodiments, an image is not merged with the non-corresponding label. Now referring to FIG. 5, in another embodiment, an embodiment includes images of a guitar, a piano, drums, and a horn with non-corresponding labels—"horn", "drums", "guitar", and "piano", respectively—written in English, the asserted non-native language. In accordance with at least one embodiment, the images are related to optimize the system's ability to detect concealment of language skills. In a preferred embodiment, the text and images can be overlaid on top of one another, rather than having the text below the images as shown in FIG. 5.

Figure 6:
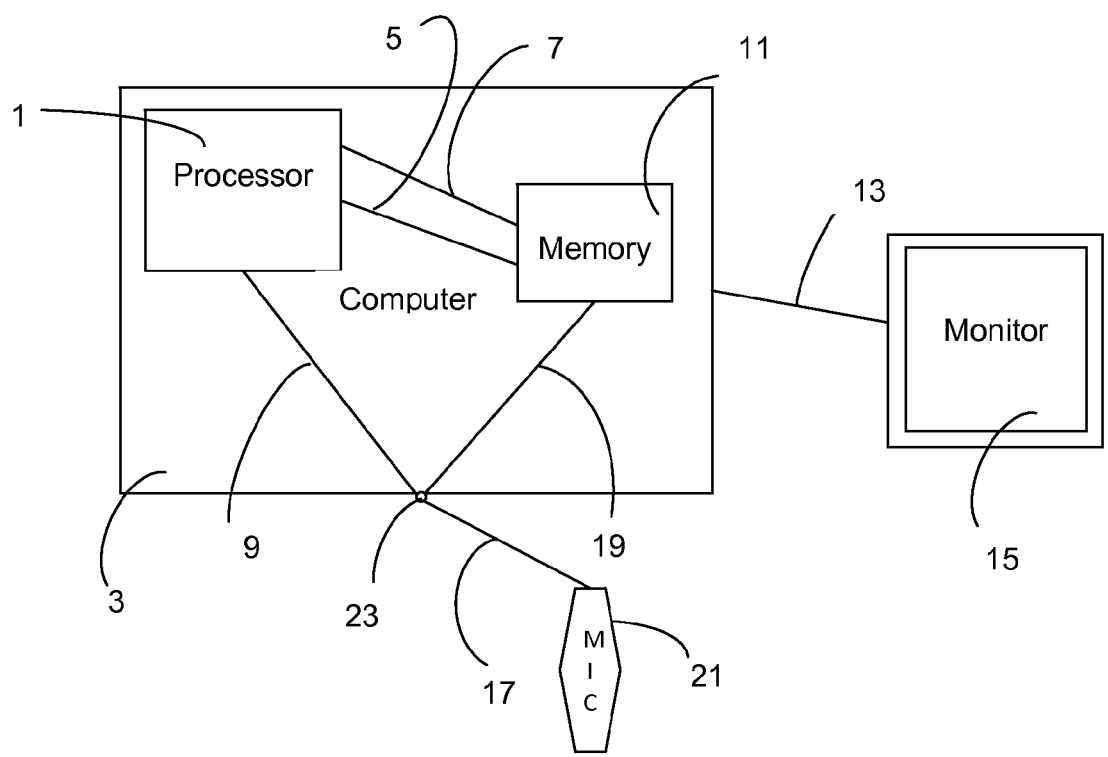
FIG. 6 is a block diagram of an embodiment of a system in accordance with at least one aspect of the present invention.

Now referring to FIG. 6, in accordance with at least one embodiment, an exemplary system of the present invention includes a processor 1; a memory 11 coupled to the processor 1 via input and output lines 5, 7; an input device, such as, but not limited to, a microphone 21, coupled to the system, such as, but not limited to, a computer 3; and a display device, such as, but not limited to, a monitor 15 for displaying the program encoded by the memory 11. The monitor 15 is coupled to the computer 3 via cable 13. A user states the images displayed by a program through microphone 21 coupled to an input port 23 of computer 3 via cable 17. Input port 23 is thereby connected to the processor 1 and memory 11 via wires 9 and 19, respectively. In accordance with one or more embodiments, the user-stated images may either transmit directly to a processor 1 and/or memory 11 depending on program directions.

In a preferred embodiment, prior to administering the test to a user, two distribution curves may be derived. The first curve is a curve of response times or "percentage correct", or other measure of accuracy for a group of users having native or fluent ability in a language. Or, the test administrator can pick another level of skill, but in any event, the first curve is the responders that understand, to a prescribed level, the information provided in the interfering channel. The second curve is the users that do not understand the information in the interfering channel, or who understand it to a much lesser degree.

Thus, two different knowledge level curves are constructed, one for those who know the information to a first prescribed degree, and those who know it to less than a second prescribed degree, where the prescribed degrees may be the same or different from each other. Than, subsequent subject's can be classified into one of the two groups.

Although the invention herein has been described with reference to particular embodiments, it is to be understood that these embodiments are merely illustrative of the principles and applications of the present invention. The invention also has applicability to the on-line gaming community, wherein users can be placed into the proper group for gaming purposes, thereby overcoming an often encountered problem of users under-representing their skills to be able to "win" the game.

It is therefore to be understood that numerous modifications may be made to the illustrative embodiments and that other arrangements may be devised without departing from the spirit and scope of the present invention as defined by the appended claims.

The invention claimed is:
1. A method comprising:
   displaying, on a display device of a system, a predetermined number of at least one image with at least one non-corresponding label in at least one language;
   having the user state, into an input device of the system, the at least one image; and
   determining, with a processor of the system, whether the user is misrepresenting his skill in the language as less than it actually is based on whether the at least one user statement was made with a delay.

2. The method of claim 1, further comprising asking the user for the name of said language.

3. The method of claim 1, further comprising pre-selecting, with the processor, at least one language to be tested for the user.

4. The method of claim 1, wherein the predetermined number of at least one image with at least one non-corresponding label in at least one language is provided to the user in at least one of: a document, a picture, a drawing, an image, and/or a file.

5. The method of claim 1, wherein the at least one image is related to other images employed to introduce and/or improve detection of concealment.

6. The method of claim 1, wherein the at least one image is at least one of: an object, a word, a picture, an illustration, a drawing, a document, a color, and/or a file.

7. The method of claim 1, wherein the at least one non-corresponding label is at least one of: an object, a word, a picture, an illustration, a text, a color, and/or a file.

8. The method of claim 1, wherein the at least one image is merged with the at least one non-corresponding label.

9. A method comprising:
displaying, on a display device of a system, a predetermined number of at least one image with at least one non-corresponding label in at least one language;
having the user state, into an input device of the system, the at least one image;
timing, with a processor of the system, the at least one user statement; and
determining, with the processor, whether the user is misrepresenting, as less than they are, his or her skill in the at least one language based upon whether the at least one user statement was made with a delay.

10. The method of claim 9, further comprising comparing, with the processor, the user statement times with at least one average and/or standard native speaker statement time, or with at least one average and/or standard speaker having a prescribed fluency statement time, for at least one image.

11. The method of claim 9, wherein the at least one image is related to other images employed to introduce and/or improve detection of concealment.

12. The method of claim 9, further comprising comparing, with the processor, the user statements for a plurality of languages being tested with at least one average and/or standard native speaker statement time for each tested language.

13. The method of claim 9, further comprising pre-selecting, with the processor, at least one language to be tested for the user.

14. The method of claim 9, wherein the predetermined number of at least one image with at least one non-corresponding label in at least one language is provided to the user in at least one of: a document, a picture, a drawing, an image, and/or a file.

15. The method of claim 9, wherein the at least one image is merged with the at least one non-corresponding label.

16. The method of claim 9, wherein the at least one image is at least one of: an object, a word, a picture, an illustration, a drawing, a document, a color, and/or a file.

17. The method of claim 9, wherein the at least one non-corresponding label is at least one of: an object, a word, a picture, an illustration, a text, a color, and/or a file.

18. A system, comprising:
at least a processor;
at least a memory coupled to the processor;
at least an input device coupled to the system; and
one or more programs in memory, the one or more programs causing the processor to determine whether a user is misrepresenting an at least one language one in which he is not fluent, wherein
(i) the one or more programs prompt the user to enter and/or select at least one language;
(ii) the one or more programs display a predetermined number of at least one image with at least one non-corresponding label in the at least one language;
(iii) the user states the at least one image into the input device; and
(iv) the one or more programs time the at least one user statement to determine whether the at least one user statement was made with a delay.

19. The system of claim 18, wherein the one or more programs pre-selects at least one language for testing.

\* \* \* \* \*